United States Patent
Mercer et al.

(10) Patent No.: US 6,480,507 B1
(45) Date of Patent: Nov. 12, 2002

(54) COMMUNICATION PROTOCOL STACK APPARATUS AND METHOD OF IMPLEMENTING SAME

(75) Inventors: David E. Mercer, Stittsville; Brian S. Major, Ottawa; A. Julian Craddock, Greely, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/196,344

(22) Filed: Nov. 19, 1998

(51) Int. Cl.$^7$ .............................................. H04L 29/06
(52) U.S. Cl. ..................... 370/469; 370/395.7; 709/230
(58) Field of Search ................................. 370/235, 229, 370/381, 401, 464, 469; 707/206; 709/104, 227, 230, 225, 238, 243; 711/170, 171

(56) References Cited

U.S. PATENT DOCUMENTS

| | | | | |
|---|---|---|---|---|
| 5,007,051 A | * | 4/1991 | Dolkas et al. ............... | 370/235 |
| 5,278,834 A | * | 1/1994 | Mazzola ....................... | 370/469 |
| 5,493,652 A | * | 2/1996 | Koufopavlou et al. ...... | 707/206 |
| 5,764,915 A | * | 6/1998 | Heimsoth et al. ............ | 709/227 |
| 5,812,775 A | * | 9/1998 | Van Seters et al. .......... | 709/213 |
| 6,016,503 A | * | 1/2000 | Overby et al. ............... | 370/229 |
| 6,088,777 A | * | 7/2000 | Sorber ......................... | 370/381 |
| 6,273,622 B1 | * | 8/2001 | Ben-David ................... | 709/230 |

* cited by examiner

Primary Examiner—Hassan Kizou
Assistant Examiner—David Odland

(57) ABSTRACT

A communication protocol stack apparatus and method determine the aggregate maximum header and trailer lengths (H, T) and a payload size(P) for each layer of the protocol stack and pre-allocate for each layer one or more buffers of a length equal to the sum of "H", "T" and "P". The layer copies receiving data into the pre-allocated buffer at a position determined by "H", and copies its header and trailer immediately before and after the data in the buffer. The layer sets two references. The next lower layer copies its header and trailer into the buffer at the positions determined by the references and updates the references. The process is repeated until the lowest layer and data between the references is copied to a physical device for transmission.

21 Claims, 9 Drawing Sheets

COMMUNICATION PROTOCOL STACK APPARATUS AND METHOD OF IMPLEMENTING SAME

FIELD OF THE INVENTION

The present invention relates to a communication protocol stack apparatus and to a method of implementing such an apparatus. More specifically, the present invention relates to a communication protocol stack apparatus and method of implementing such an apparatus in systems with limited memory allocation, access and arrangement operations available.

BACKGROUND OF THE INVENTION

In data communication networks, it is common to employ several protocols, which are often arranged in layers. For example, it is common for many networks to employ at least some in portion of the ISO Open Systems Interconnection (OSI) Reference Model to deal with communication protocols and network architectures. As is well known, the ISO reference model has seven layers, defined as: the Application layer; the Presentation layer; the Session Layer; the Transport layer; the Network layer; the Data-link layer; and the Physical layer. Generally, it is common that only a subset of the seven layers are employed within a network or that one or more layers are merged.

Each layer of the reference model employs the services of the layer below it and provides services to the layers above it. Thus, for example, the Network layer which is responsible for establishing and maintaining the flow of messages between connected points in the network is dependent upon the Data-link layer to provide character and message synchronization and error correction. The Data-link layer is, in turn, dependent upon the Physical layer to actually transmit and receive information as electrical signals on the network.

An apparatus implementing a collection of protocol layers, such as the seven layers of the OSI Reference Model or a subset or variant thereof, is commonly referred to as a protocol stack. For example, the commonly used TCP/IP protocol is generally implemented as a five layer tack, including: the Application layer; the Transport layer (TCP); the Network layer (IP); the Data-link layer (PPP); and the Physical layer (Ethernet, etc.).

Due to the time critical nature of the services provided by a protocol stack, the performance of the layers is an important factor. Further, the amount of memory resources required by a protocol stack are of concern in many systems. Accordingly, protocol stacks were commonly implemented in early communication systems in machine language. While this provided efficient use of system resources and met real time response standards, protocol stacks can be complex systems to implement and modify, especially for the more advanced protocols now commonly in use, and machine language is not generally preferred for the construction and maintenance of such complex systems.

More recently, protocol stacks have been implemented in the C or C++ programming languages, and similar high level languages. Such high level languages are preferred as they provide a better environment for the development and maintenance of complex systems. Another reason for selecting these languages is that they still provide for processor efficient operations, such as pointer arithmetic, and fine grained memory allocation and management operations, via the malloc family of system calls for example, which allow for efficient memory usage. Further, data structures such as C unions and structs are available which allow the implementer of the protocol stack to explicitly control the representation of data structures in memory.

More recently, much interest and development has occurred with the Java programming language. Java is an interpreted language which comprises a series of byte codes that are compiled from Java source code. These byte codes are usually interpreted (or in some cases compiled by a Just in Time compiler) and executed by a Java Virtual Machine (VM) which is a program executing on the target platform. A Java program can thus be executed on any computer system for which a Java VM exists.

However, Java offers some challenges to those wishing to implement many types of systems. For example, unlike machine language, C, C++ and many other programming languages, for simplicity of coding and other reasons, such as security and automatic garbage collections, Java does not provide any mechanism for explicitly defining the representation of objects in memory, nor does Java guarantee a specific representation for defined data types in memory, i.e.—while a short integer data type is defined in the Java specification as sixteen bits for calculation purposes, it is legal that it can be represented in memory as thirty-two bits. Java also does not support the explicit allocation or deallocation of blocks of memory or the traversing of memory structures using pointer arithmetic. In fact, one of Java's features is its automatic "garbage collection" wherein implicitly deallocated memory is reclaimed and free memory is consolidated. During a garbage collection cycle the memory representation of an object can change from what it was prior to the cycle.

Java's lack of explicit memory allocation, deallocation and traversing features and its lack of a mechanism to explicitly define the representation of an object in memory has made it difficult to implement a protocol stack which provides acceptable performance with acceptable memory requirements.

Generally, the passing of information between layers in a protocol stack implemented in Java can quickly result in the fragmentation of memory in the Java VM and the consumption of that memory by unreferenced objects. Such fragmentation and consumption can adversely affect the performance of the stack due to the relatively excessive memory allocations and data copy operations performed at each layer. In particular, implementations employing the passing of message objects between layers have been found to be inefficient, and often unacceptable, due to the high overheads involved in allocating new memory, garbage collecting unreferenced objects and streaming objects to physical devices.

It is therefore desired to have a protocol stack apparatus and method of implementing such a stack apparatus which can be relatively efficiently implemented in systems, such as those employing the Java language, which have limited memory allocation, access and arrangement operations available.

SUMMARY OF THE INVENTION

It is an object of the present invention to provide a novel protocol stack apparatus and method of implementing such a protocol stack apparatus which obviates or mitigates at least one disadvantage of the prior art.

According to a first aspect of the present invention, there is provided a communication protocol stack apparatus, comprising: a first protocol layer; at least one protocol layer below said first protocol layer in said stack; a binding mechanism to bind said first and each said at least one protocol layers together into a protocol stack, said binding mechanism determining for each layer of said protocol stack in turn, from a lowest layer to said first layer, an aggregate maximum header length and aggregate trailer length for said layer and each layer below said layer; a buffer allocation mechanism to allocate at least one memory buffer for each layer of said protocol stack, said at least one buffer of each layer having a length at least equal to the sum of said aggregated maximum header and trailer lengths determined for said layer and a selected maximum data payload size; a buffer passing mechanism to pass an allocated buffer from a higher layer to a lower layer in said protocol stack, said buffer passing mechanism: for a protocol layer, copying data to be transmitted from said higher layer into said buffer starting at a position offset from the first position of said buffer by a number of positions equal to said aggregated maximum header length determined for said higher layer, copying an encapsulated header for said higher layer into said buffer at the positions immediately preceding said data copied to said buffer and copying an encapsulating trailer for said higher layer into said buffer at the positions immediately following said data and setting a first indicator to the start position of said encapsulating header in said buffer and setting a second indicator to the end position of said encapsulating trailer in said buffer; and for each lower layer in said protocol stack, in turn, copying an encapsulating header for said lower layer into said buffer at the positions immediately preceding said position indicated by said first indicator and copying an encapsulating trailer for said lower layer into said buffer at the positions immediately following said position indicated by said second indicator and updating said first indicator to the start position of said encapsulating header for said lower layer in the buffer and updating said second indicator to the end position of said encapsulating trailer for said lower layer in the buffer.

According to another aspect of the present invention, there is provided a method of implementing a communication protocol stack of at least a higher protocol layer and a lower protocol layer, comprising the steps of:

(i) determining for each protocol layer of said stack the maximum aggregate header and aggregate trailer length for the layer and each lower layer;

(ii) allocating, for each protocol layer of the stack, at least one memory buffer having a length at least equal to the sum of the determined maximum aggregate header and maximum aggregate trailer lengths for the layer and a selected maximum data payload length;

(iii) receiving at a first layer data to be transmitted from said stack;

(iv) selecting an available buffer from said at least one memory buffer allocated for said first layer;

(v) copying information representing a portion of said received data, not exceeding said selected maximum data payload length, to said buffer starting at a position offset from the start of said buffer by a length equal to said determined maximum header length for said protocol layer;

(vi) copy information representing an encapsulating header for said protocol layer to the positions in said buffer immediately preceding said information previously copied into said buffer and copying information representing an encapsulating trailer for said layer to the positions in said buffer immediately following said information previously copied into said buffer;

(vii) setting a first indicator to indicate the first position in said buffer of said information representing said encapsulating header of said protocol layer and setting a second indicator to indicate the last position in said buffer of said information representing said encapsulating trailer for said protocol layer;

(viii) passing said buffer to the next lower protocol layer in said stack;

(ix) repeating steps (vi) through (viii) until information from the lowest layer has been copied into said buffer and said first and second indicators set accordingly; and (x) copying the information in said buffer, between the position indicated by said first indicator and the position indicated by said second indicator to a data transmission device.

According to another aspect of the present invention, there is provided a method of constructing and using a protocol stack comprising at least two protocol layers, comprising:

(i) for each layer of said stack determining a maximum length comprising the sum of a pre-selected maximum data payload length and a maximum aggregate header length and a maximum aggregate trailer length, said aggregates including each layer in said protocol stack below said layer;

(ii) for each layer allocating at least one buffer of said maximum length;

(iii) receiving data to be transmitted at a layer and copying said data into said at least one buffer at a position offset from the start of the buffer by said maximum aggregate header length determined for said layer, copying into said buffer immediately before said copied data a header for said layer, copying into said buffer immediately after said copied data a trailer for said layer and setting indicators of the positions within said buffer of the start of said header and the end of said trailer;

(iv) passing said buffer to a lower layer of said stack, said lower layer copying into said buffer immediately preceding the start of the header in said buffer as indicated by said indicator a header for said layer and copying into said buffer immediately after the end of the trailer in said buffer as indicated by said indicator a trailer for said layer and updating said indicators of the positions of the start of the headers and the end of the trailers accordingly;

(v) at the lowest level of said stack, copying to a data transmission device said data between said indicators.

The present invention provides a communication protocol stack apparatus and method which determines the aggregated maximum encapsulating header and trailer lengths for each layer of the stack and pre-allocates, for each layer, one or more buffers of a length equal to the sum of the determined maximum header and trailer lengths and a selected maximum data length. The layer of the stack receiving the data copies it into one of the pre-allocated buffers for that layer at a position offset by the determined maximum aggregate header length. The layer copies the encapsulating header to a position immediately before the location of the data in the buffer and copies the encapsulating trailer to a position immediately after the data in the buffer. The layer also sets a reference to the position of the start of the encapsulating header in the buffer and the position of the end of the encapsulating trailer in the buffer. The next lower layer of the protocol stack copies its encapsulating header into the buffer before the position indicated by the reference to the start of the header and the updates the reference accordingly. In a similar manner, the lower layer of the protocol stack copies its encapsulating trailer after the end of the previous layer's trailer, as indicated by the reference to the end of the trailer, and then updates that reference accordingly. The process is repeated until the lowest layer is reached where the array of headers, data and trailers between the two references is copied to a physical device for transmission.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
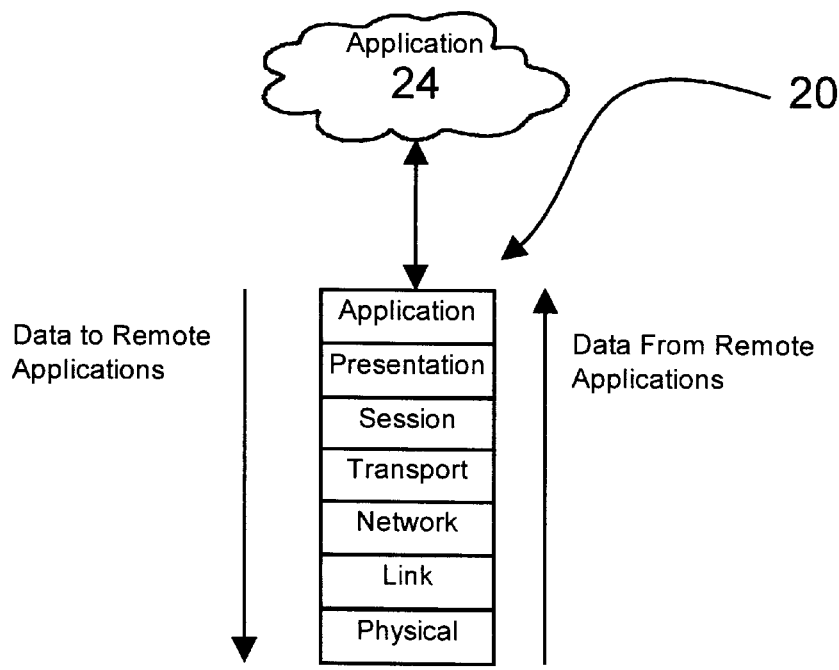
FIG. 1 shows a schematic representation of a protocol stack implementing the seven layer ISO Open Systems Interconnection (OSI) Reference Model.

Before discussing the present invention in detail, prior art protocol stacks will be described briefly. FIG. 1 shows a protocol stack 20 implementing the seven layer ISO Open Systems Interconnection (OSI) Reference Model. As shown in the Figure, in this example an Application 24 communicates with stack 20 at the Application layer which in turn passes communication data to each succeeding lower layer and finally to the Physical layer and on to the remote application (not shown). Similarly, data from the remote application is received by the Physical layer which in turn passes communication data to each succeeding higher layer and finally to the Application layer and on to the Application 24.

Figure 2:
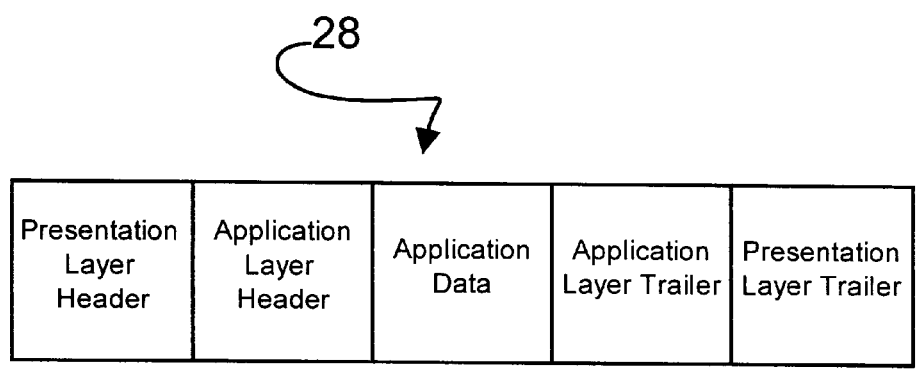
FIG. 2 shows a schematic representation of a prior art protocol data unit at the Presentation layer of the stack shown in FIG. 1.

When data is received at the Application layer from application 24, it is wrapped, or encapsulated, between a header and a trailer added by the layer and this resulting structure is referred to as a Protocol Data Unit (PDU). The header of the PDU generally contains data to identify the contents, destination and length of the wrapped data, as well as an identification of the data's source. The trailer generally contains error detection and/or correction data. Upon receiving a PDU from a higher layer, each successive lower layer adds its own appropriate header and trailer information to the PDU, which thus grows in size. FIG. 2 shows a PDU 28 which has been received from the Application layer by the Presentation layer, which has added header and trailer information to it as shown.

When a PDU is received by a higher layer from a lower layer, the inverse process occurs with the header and trailer for the lower layer being removed as the destination is extracted from the header, error correction, etc. is performed and the PDU, which is now smaller, is then passed to the next higher layer.

Conventionally, memory resources are allocated to protocol layers on demand, via system calls, such as the C programming language's malloc( ) function. When no longer needed, the memory is explicitly deallocated via the appropriate system call, such as C's free( ) function. Without exercising care, as processing proceeds over time, the memory available to the protocol stack tends to become fragmented, and eventually only small contiguous areas of memory are available, these areas being too small for use by the protocol stack.

To avoid such fragmentation problems, protocol stacks are commonly implemented with their own memory allocation scheme, allocating fixed size buffers from large blocks of memory. This reduces the overhead involved with operating system allocation and deallocation functions and allows the protocol stack to control memory fragmentation. Commonly, an allocated fixed-size buffer is traversed via pointer arithmetic wherein data is retrieved or stored within the buffer, relative to the first address of the buffer, by incrementing or decrementing a pointer to the first address by the appropriate amount.

As mentioned above, a problem exists when implementing a protocol stack in languages such as the Java language, which have limited memory allocation, access and arrangement operations available, as such a memory allocation scheme cannot be implemented for a protocol stack. Two different techniques have previously been employed in attempts to implement a protocol stack in languages such as Java. These techniques are PDU Encapsulation and Data Buffer Copying.

In PDU encapsulation, a PDU base class is successively encapsulated within classes derived from the PDU base class. For example, an Application passes a data buffer to a layer which forms an initial PDU via the constructor PDU (byte [ ]):PDU. This call causes a PDU object, containing the passed data buffer, to be allocated. The layer then adds its header and trailer data to the object and passes it to a lower layer. A lower layer constructs a PDU via a call to the constructor PDU (PDU):PDU, passing the received PDU object to the constructor. This results in a new PDU object being created, encapsulating the received PDU object, and the layer then adds its header and trailer information to the new PDU object.

When the PDU object is to be written to a physical device, the method getBuffer( ):byte[ ] is called. This method allocates a byte array and, understanding the semantics of the header and trailer of the PDU, creates a byte array representation of the header, calls getBuffer( ) on the encapsulated PDU and copies the data into the allocated byte array and then copies a byte array representation of the trailer into the allocated byte array. As will be apparent, this technique suffers from excessive object allocation, utilizing memory resources and incurring overhead, and the runtime expense of having to make recursive copies of buffers.

The second technique previously employed in attempts to implement a protocol stack in languages such as Java is Data Buffer Copying. In this technique, successive allocation and copying of passed data is performed. Specifically, an application passes data to a layer which forms an initial PDU object via the construction PDU (byte[ ]):PDU. This results in a byte array being allocated of a sufficient size to hold the received data and the encapsulating header and trailer. The header is composed in the buffer, after which the received data is copied to the buffer and the trailer is then composed into the buffer.

Lower layers receiving a PDU buffer from a higher layer construct PDU's via calls to the constructor PDU (byte[ ]):PDU, passing the received buffer. This causes a PDU object to be allocated, encapsulating the passed buffer and the encapsulating header and trailer. When the PDU is to be written to a physical device, a layer simply copies the PDU object's buffer to the device.

When a lower layer receives data, the layer allocates a data buffer of sufficient length to hold the PDU's encapsulated payload, copies the payload into the allocated buffer and passes the allocated buffer to the appropriate upper layer. This technique also suffers from excessive object allocation, utilizing memory resources and incurring overhead, and the runtime expense of having to make recursive copies of buffers.

The present invention will now be described, with reference to FIGS. 3a through 6. Unlike the prior art protocol stacks discussed above, in the present invention a means is provided by which buffers can be pre-allocated in the Java VM, or the like, thus avoiding the performance and memory cost of excessive object allocations, Further, a means is provided by which these buffers can be passed between layers of the stack with little copying of information being required. Specifically, the present invention comprises three principal mechanisms: a discovery mechanism; a buffer pre-allocation mechanism; and a buffer passing mechanism.

The discovery mechanism of the present invention operates such that, when a protocol stack layer is bound to a lower level, typically at the time of initializing the system, it queries in turn each lower layer of the stack with which it must bind to determine the aggregated maximum header and trailer overheads imposed by the layers. If a lower layer has more than one protocol, the largest applicable value of the protocols in the layer is selected.

Figure 3A:
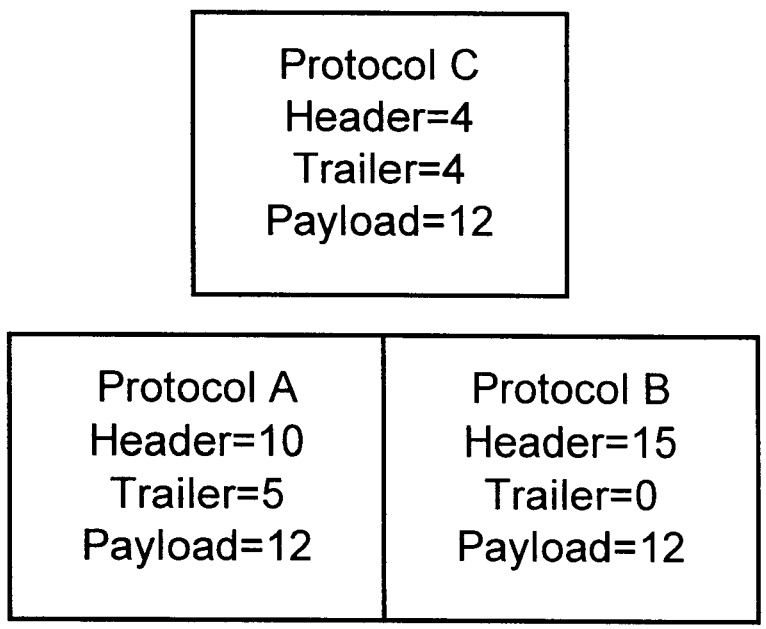
FIG. 3a shows a schematic representation of three protocols, two which have been bound in a layer and one to be bound as a higher layer.

FIG. 3a shows three protocols A, B and C wherein protocols A and B have already been bound into one layer and protocol C is to be bound as the layer above this layer. In the present invention, as part of the binding of the protocol layers, the discovery mechanism determines the maximum header and trailer length for each protocol in a lower level. In a present embodiment of the invention, each layer includes getMaxHeader( ) and getMaxTrailer( ) methods which return the aggregate maximum header length and trailer lengths, respectively, of the layer and all layers below it. It will be apparent to those of skill in the art that any other suitable technique for determining the aggregate header and trailers, such as explicitly providing this information to layers, can also be employed. It is also contemplated that a pre-selected number of buffers be allocated for each layer, the number being appropriately selected in accordance with the protocols handled by the stack, the system resources available and other factors as will occur to those of skill in the art.

Figure 3B:
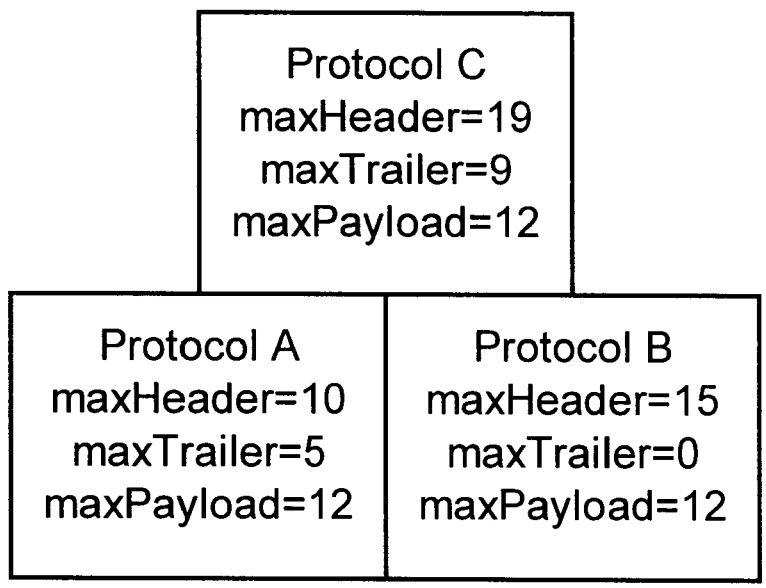
FIG. 3b shows the three protocols of FIG. 3a after they have been bound into a stack in accordance with the present invention.

In the example of FIGS. 3a and 3b, the discovery mechanism determines that the largest maximum header size of the lower level is fifteen bytes (protocol B) and the largest maximum trailer size is five bytes (protocol A). As shown, Protocol C has a maximum header length of four bytes, a maximum trailer length of four bytes and a maximum data payload of twelve bytes. While each of these values can be less than the maximum values, the maximum values are employed by the discovery mechanism. Thus, after the bind operation is performed, the aggregated maximum header and trailer sizes for the layer containing protocol C are nineteen (four plus fifteen) and nine (four plus five) respectively, as shown in FIG. 3b. The binding operation is performed for each layer of the stack, from the lowest to the highest, with each layer maintaining a record of the largest aggregate size of itself and the lower layers. In the event that another layer is to be bound above Layer C, the values returned to the higher layer by layer C's getMaxHeader( ) and getMaxTrailer( ) methods will be nineteen and nine respectively.

When the binding is performed, and the maximum aggregate header and trailer sizes for each layer have been determined, each protocol layer will allocate a set of buffers of class PDU with a length equal to the sum of the size of the maximum header (maxH), maximum trailer (maxT) and maximum data length, or payload, (maxP) for the allocating layer. In the case where the maximum data payload is overly large, a reasonable compromise length can be selected by the implementer of the stack. It is contemplated that each set of buffers will form a pool of buffers which are managed by each respective layer. The actual method by which use of the pooled buffers is managed is not particularly limited in the present invention and can include semaphores, locks, allocation tables, etc. and can vary from layer to layer. Whichever buffer management technique is employed, the manager must be able to determine when a buffer is available for re-use which can vary, according to the protocol. For example, with 'unreliable' protocols, such as the User Datagram Protocol and the Internet Protocol, a buffer can be reused as soon as the lowest layer of the stack has transmitted the data. In 'reliable' protocols such as the Transport Control Protocol, the buffer can only be re-used once the data has been successfully received at the destination.

Each buffer allocated for a layer is represented as a byte array of length pL=maxH+maxT+maxP, as determined for that layer, and has references to the start location of the header (hS) and the end of the trailer (tE) within the byte array. These buffers are then used when applications or physical devices communicate directly with the layer. In contrast, when an upper layer communicates with a lower layer, the buffer in the passed PDU object is used as the target for the encapsulating header and trailer. When a PDU object is passed from a lower level to a higher level, the hS and tE references are updated appropriately to refer to the data of interest to the higher level. Similarly, when a PDU object is passed from a lower layer to a higher layer, the lower layer processes its header and trailer in the buffer and then passes the updated PDU object to the higher layer.

Each buffer includes the following methods:

a method which returns a reference to the array which carries the data payload, referred to herein as "getBufferAsByteArr( ):byte[ ]";

a method which returns a reference to the header start (hS), referred to herein as "getHeaderStart( ):int";

a method which returns a reference to the end of the trailer (tE), referred to herein as "getTrailerEnd( ):int";

a method which sets a new value for the header start (hS), referred to herein as "setHeaderStart(hS:int):void"; and a method which sets a new value for the trailer end (tE), referred to herein as "setTrailerEnd(tE:int):void".

The buffer passing mechanism operates as follows, for layer to layer communications. In this example, an application wishes to transmit a message via the two layer stack of FIG. 3*b*, using protocols C and A. The application calls a send(msg:byte[ ]) method of protocol C. If no buffer is available (i.e.—all pre-allocated buffers are in use) in protocol C, the method is blocked until a buffer becomes available.

Figure 4A:
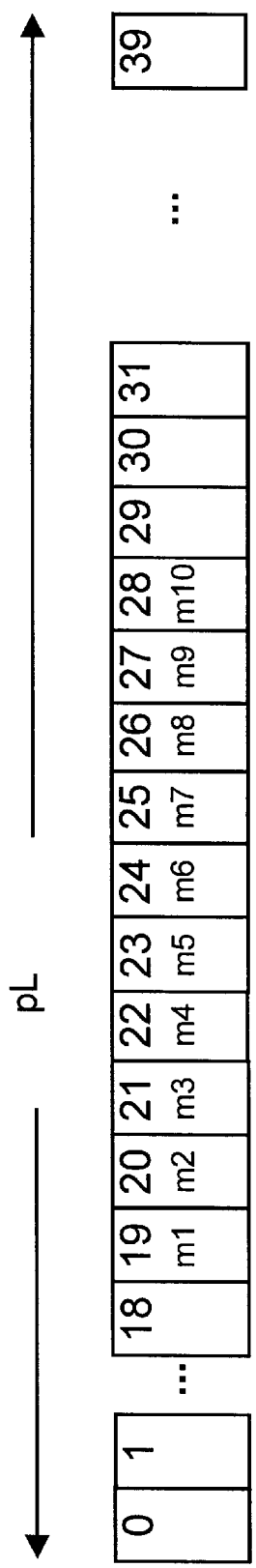
FIG. 4a shows message data being copied into a buffer in accordance with the present invention.

Assuming that a buffer "buf" is available in protocol C, the send method copies the passed msg array into the buffer, with the first byte of the message (m1) being located at position maxH for that layer, in this example index nineteen, as shown in FIG. 4*a*. In the example of FIG. 4, the maximum payload length (maxP) of protocol C is twelve, thus the total length pL of the buffer is forty bytes (maxH+maxP+maxT= 19+12+9=40), running from index 0 to index 39, and the length of the msg being sent is ten bytes, two bytes less than the maximum payload. In the event that the length of the message is greater than the value of maxP for the layer, the message is fragmented into portions no longer than maxP and is transmitted one fragment at a time.

Figure 4B:
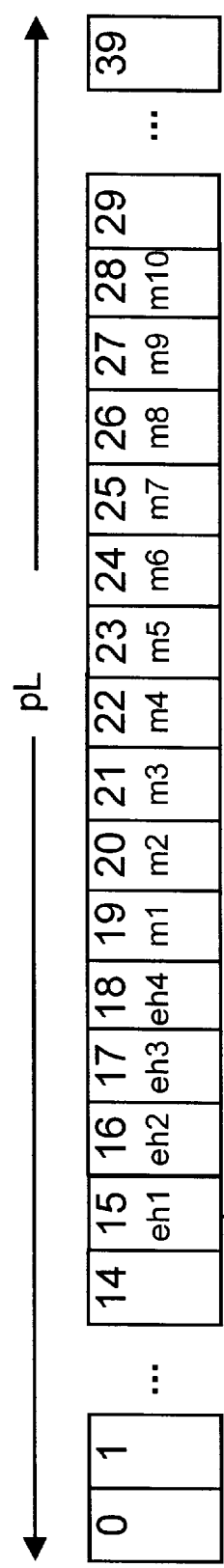
FIG. 4b shows an encapsulating header being copied into the buffer of FIG. 4a in accordance with the present invention.

The encapsulating header of protocol C (of length eH=4) is then copied into the buffer, starting at position maxH—eH (i.e. at index fifteen in this example) and the setHeaderStart ( ) method is then called with the parameter maxH-eH (i.e. 19−4=15 in this example), as shown in FIG. 4*b*.

Figure 4C:
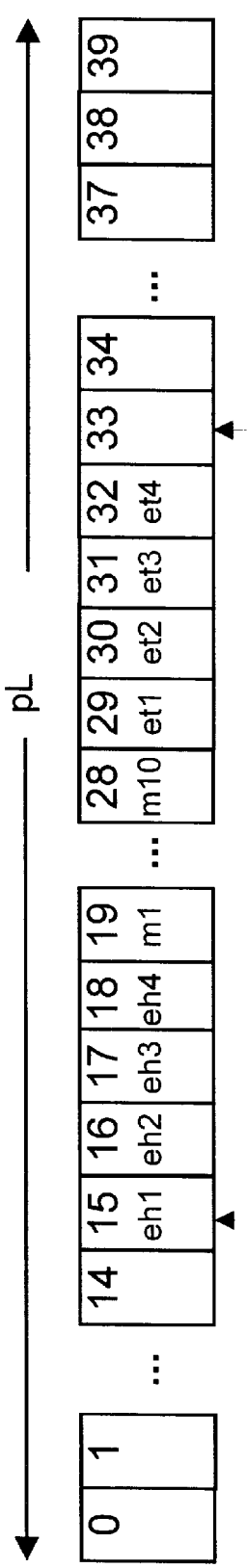
FIG. 4c shows an encapsulating trailer being copied into the buffer of FIG. 4a in accordance with the present invention.

The encapsulating trailer (of length eT=4) is then copied into the buffer, starting at position maxH+message length (i.e.—at index 19+10=29 in this example) and the setTrailerEnd( ) method is called with the parameter maxH+ message length+eT (i.e.—19+10+4=33 in this example), as shown in FIG. 4*c*.

Now that the buffer for the topmost layer (protocol C) has been correctly formed, the method sendMessageBuffer (buf:buffer) of the next lower layer (protocol A) is invoked with buff. The lower layer then copies it's encapsulating header into buf, starting at the position returned by getHeaderStart( ) minus eH, where eH is the length of the encapsulating header to be copied. The method setHeaderStart( ) of buf is then called with the parameter the position returned by getHeaderStart( ) minus eH as its parameter.

Figure 4D:
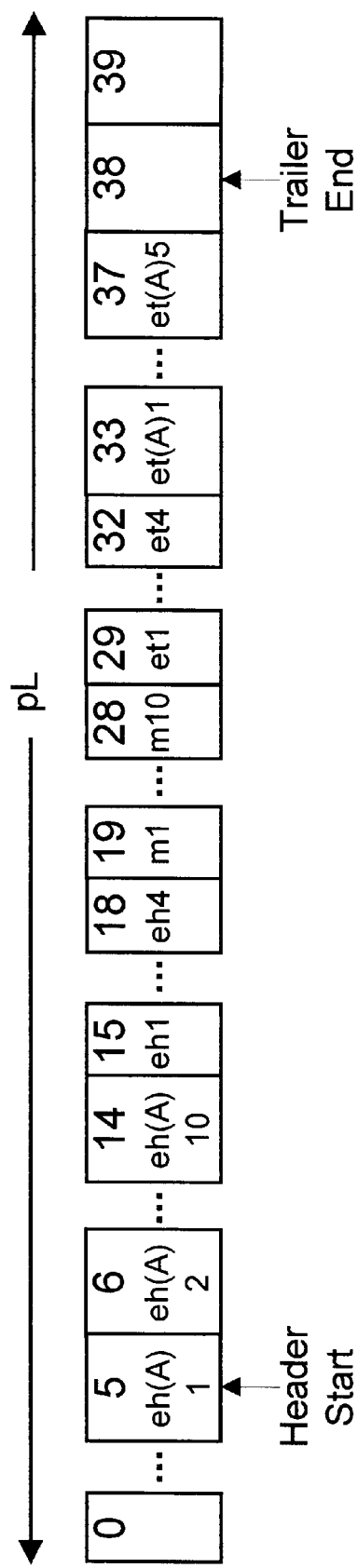
FIG. 4d shows the buffer of FIG. 4a after the encapsulating header and trailer of a second protocol have been copied into the buffer.

Next, the lower layer copies its encapsulating trailer into buf, starting at the position returned by getTrailerEnd( ) and the method setTrailerEnd( ) of buf is called with the value returned by getTrailerEnd plus eT as its parameter, with the result shown in FIG. 4*d*, wherein the header and trailer for protocol A are indicated by eh(A) and et(A).

Finally, at the bottom of the stack, the method buf.getBufferAsByteArr( ) is called to return the values between the positions returned by getHeaderStart( ) and getTrailerEnd( ) and the value returned by getHeaderStart( ) and the value returned by getTrailerEnd( ), less one (i.e. getTrailerEnd( )-1), are copied to the physical device.

As will be apparent to those of skill in the art, if more than two layers of the protocol stack are between the application and the physical device, the steps described above are repeated at each additional layer to add the encapsulating headers and trailers and to update the header start reference and the trailer end reference appropriately.

As will also be apparent to those of skill in the art, when a communication is received at a lower layer of the stack and is passed to a higher layer, the lower layer can process the PDU in the buffer contents in the appropriate manner and then need only appropriately update the header start and trailer end references to pass the buffer to the next higher level and data (trailers, headers, etc.) outside the bounds defined by the header and trailer reference pointers will be ignored. Once the buffer is processed by the destination layer, the buffer is marked as being available for re-use.

Figure 5:
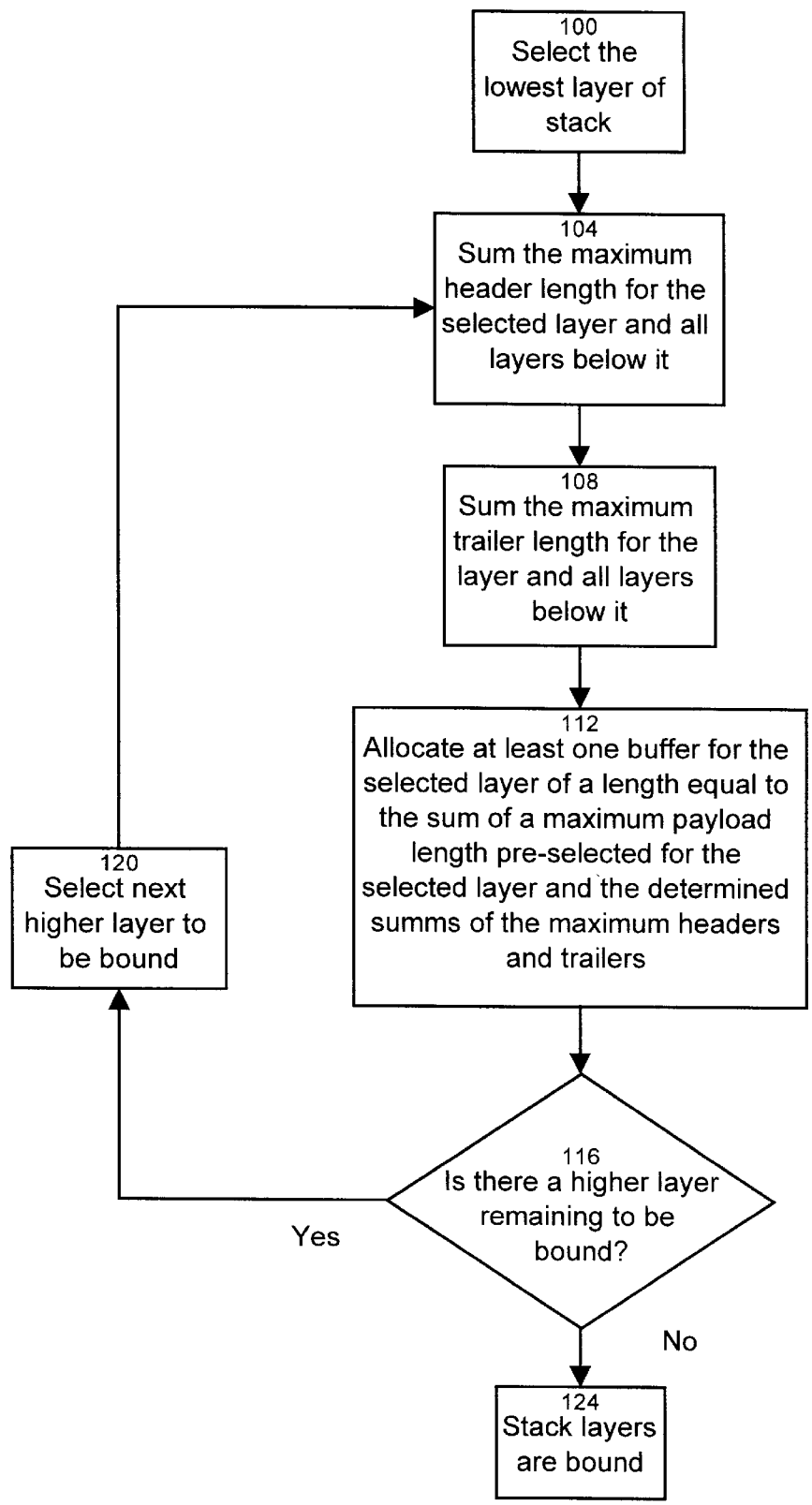
FIG. 5 shows a flowchart of the binding and buffer pre-allocation process of the present invention.

FIG. 5 shows a flowchart of the binding and allocation process described above. First, at step 100, the lowest layer of the stack is examined and the maximum header length of the protocols in that layer, and those below it (if any) are determined at step 104. A similar process is performed at step 108 to determine the maximum trailer length. At step 112, at least one buffer is allocated for that layer with a length equal to the sum of the determined maximum header and trailer lengths and the maximum payload, or a selected maximum payload value less than the otherwise maximum length.

At step 116, as determination is made as to whether a higher layer remains to be considered. If a higher layer remains to be considered, at step 120 the next higher level is selected and steps 104 through 116 are then performed for the selected higher layer. If no higher layer remains to be considered, binding of the stack layers is completed at step 124.

Figure 6:
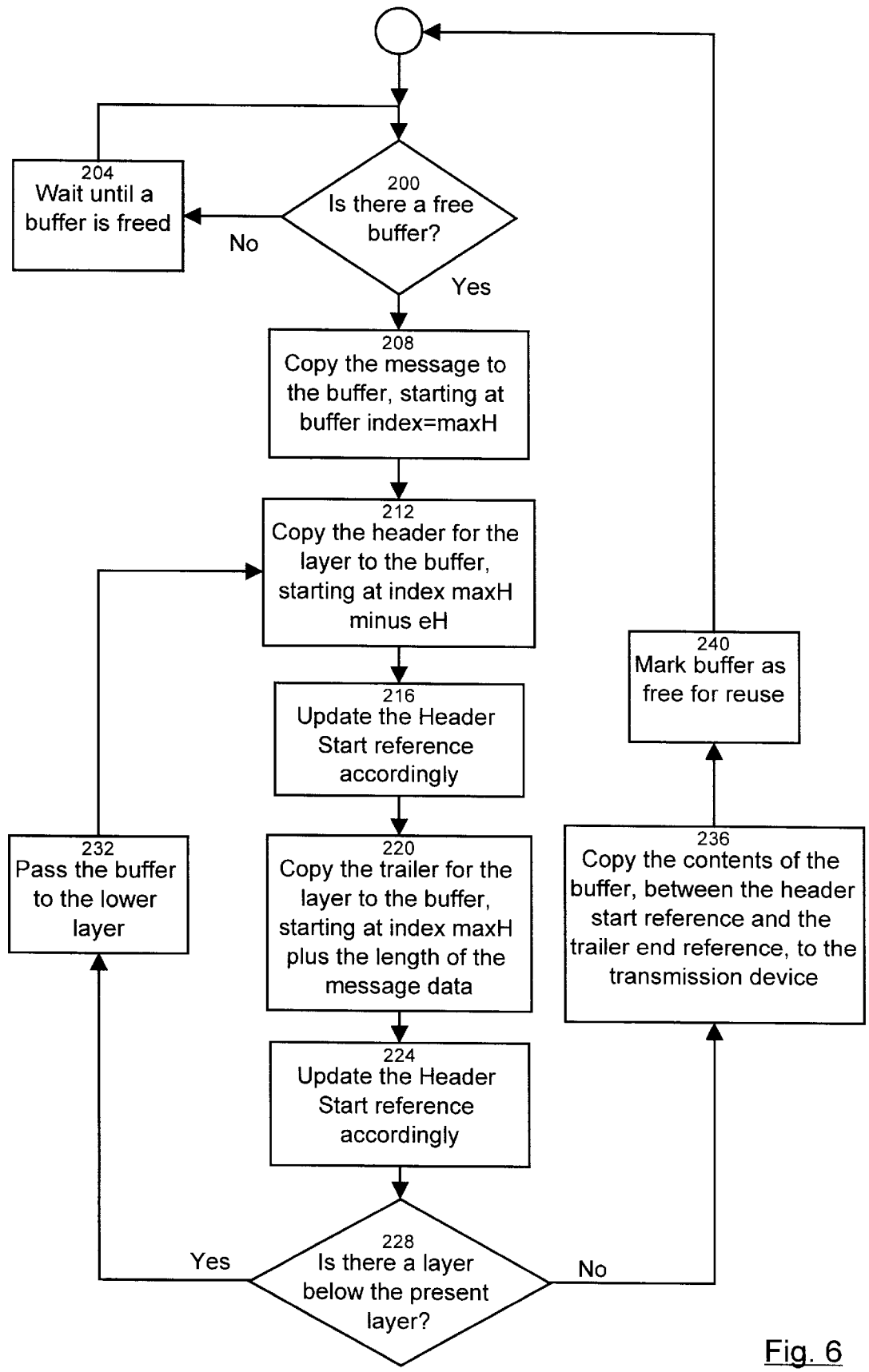
FIG. 6 shows a flow chart of the construction of a protocol data unit with a pre-allocated buffer in accordance with the present invention.

FIG. 6 shows a flowchart of the process of constructing PDU's with a pre-allocated buffer in accordance with the present invention. At step 200, a determination is made as to whether a buffer is available for use. If no buffer is available, the process waits, at step 204, until a buffer becomes available, after which step 200 is performed again.

If, at step 200 a buffer is available, the message data (payload) is copied into the buffer at step 208, starting at the index position equal to the previously determined maximum header length (maxH) for that layer. As mentioned above, the message data is arranged to be no longer than the maximum payload length for the layer.

At step 212 the encapsulating header (of length eH) for the layer is copied into the buffer, starting at index maxH— eH. At step 216, the reference to the start of the header within the buffer is updated accordingly.

At step 220 the encapsulating trailer (of length eT) for the layer is copied into the buffer, starting at index maxH+the message length. At step 224, the reference to the end of the trailer, which points to the first array entry after the end of the trailer, is updated accordingly.

Figure 7:
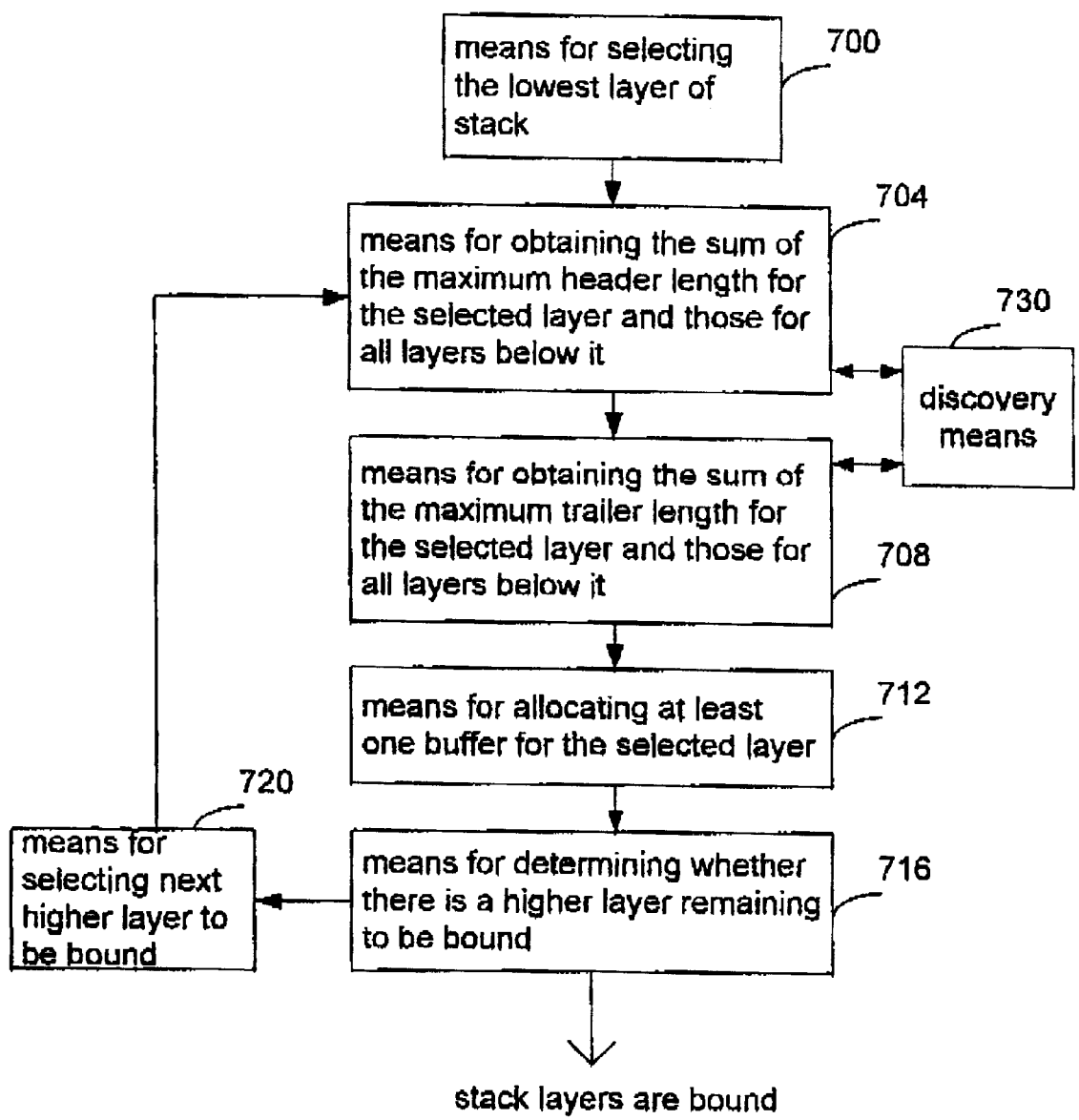
FIG. 7 shows a block diagram of the discovery, the binding and the buffer pre-allocation mechanisms in accordance with an embodiment of the present invention.

FIG. 7 shows a block diagram of the discovery, the binding and the buffer pre-allocation mechanisms in accordance with an embodiment of the present invention. Selecting means 700 selects the lowest layer of the stack. Aggregating means 704 obtains a maximum header length of the protocols in that layer and those below it (if any) to determine the aggregate maximum header length. Aggregating means 708 obtains a maximum trailer length of the protocols in that layer and those below it (if any) to determine the aggregate maximum trailer length. Discovery means 730 may determine maximum header and trailer lengths for each protocol in a lower layer (if any). Allocating means 712 allocates at least one buffer for that layer with a length equal to the sum of the determined maximum header and trailer lengths and the maximum payload, or a selected maximum payload value less than the otherwise maximum length.

Determining means 716 determines whether a higher layer remains to be considered. If a higher layer remains to be considered, selecting means 720 selects the next higher layer. The determining means 704 and 708 and the allocating means 712 perform their operations for the selected higher layer. If no higher layer remains to be considered, binding of the stack layers is completed.

Figure 8:
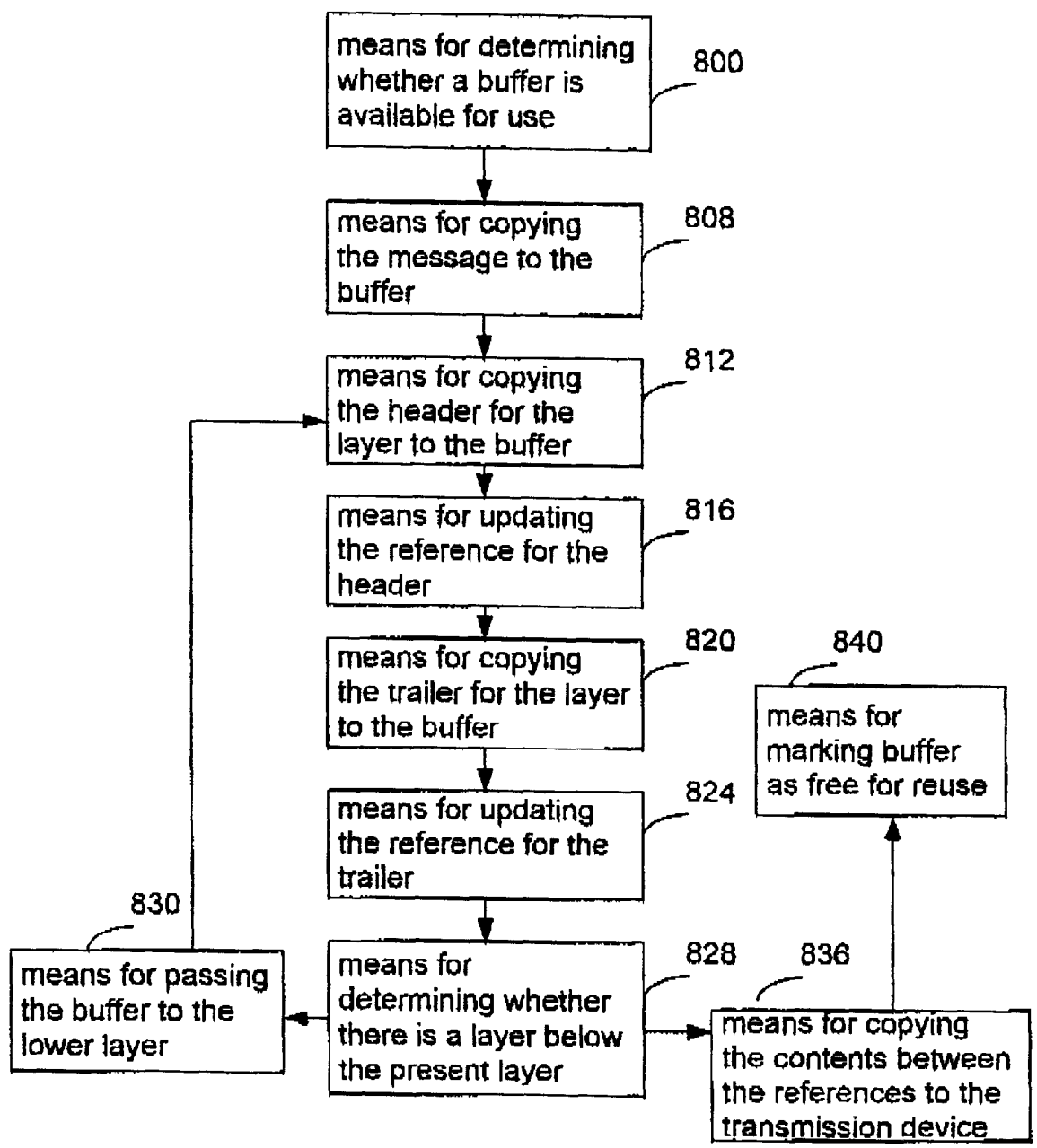
FIG. 8 shows a block diagram of the buffer passing mechanism in accordance with an embodiment of the present invention.

FIG. 8 shows a block diagram of the buffer passing mechanism in accordance with an embodiment of the present invention. Determining means 800 determines whether a buffer is available for use. If no buffer is available, the determining means 800 waits until a buffer becomes available.

If a buffer is available, copying means 808 copies the message data (payload) into the buffer. The copied payload starts at the index position equal to the previously determined maximum header length (maxH) for that layer. As mentioned above, the message data is arranged to be no longer than the maximum payload length for the layer.

Copying means 812 copies the encapsulating header (of length eIm) for the layer into the buffer. The copied header starts at index maxH—eH. Updating means 816 updates the reference to the start of the header within the buffer accordingly.

Copying means 820 copies the encapsulating trailer (of length eT) for the layer into the buffer. The copied trailer starts at index maxH+the message length. Updating means 824 updates the reference, which points to the first array entry after the end of the trailer, to the end of the trailer.

Determining means 828 determines whether the buffer needs to be passed to a lower layer of the stack. If such a lower layer exists, passing means 830 passes the buffer to the lower layer. The copying means 812 and 820 and the updating means 816 and 824 perform their operations for the lower layer.

If the determining means 828 determines that the lowest layer of the stack has been reached, copying means 836 copies the buffer contents. between the header start reference and the trailer end reference to a device, such as an ethernet card, for transmission. The process completes with the buffer being marked as available for reuse by marking means 840, at the appropriate time as mentioned above, depending upon the protocol.

Figure 9:
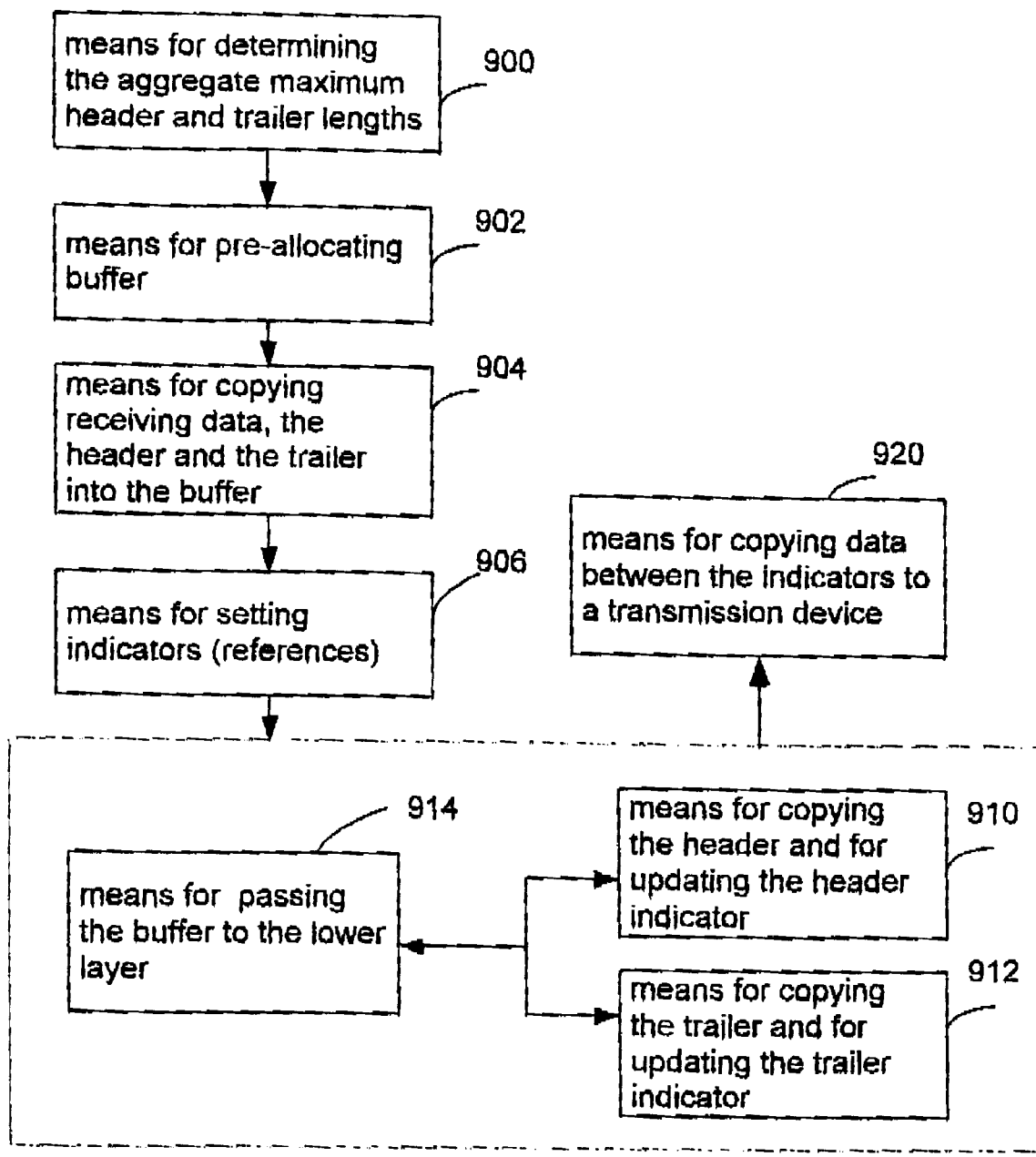
FIG. 9 shows a block diagram illustrating another example of a system in accordance with an embodiment of the present invention.

FIG. 9 shows a block Diagram illustrating another example of a system in accordance with an embodiment of the present invention. Determining means 900 determines the aggregated maximum encapsulating header and trailer lengths for each layer of the stack for binding layers. Pre-allocation means 902 pre-allocates. for each protocol layer of stack, at least one buffer of a length equal to the sum of the determined aggregate maximum header length and the determined aggregate trailer length and a pre-selected maximum data length.

Receiving means 904 receives, at a protocol layer, data from an application. By the receiving means 904, the data is copied into one of pre-allocated buffers for the layer at a position offset by the determined maximum aggregate header length and an encapsulating header for the layer is copied at a position immediately before the location of the data in said buffer, and an encapsulating trailer for the layer is copied at a position immediately after the data in said buffer.

Setting means 906 sets an indicator of the position of the start of the encapsulating header in the buffer and sets an indicator of the position of the end of the encapsulating trailer in the buffer.

Passing means 914 passes the buffer, in turn, to each next lower layer of the protocol stack.

Copying means 910 copies the encapsulating header of the lower layer into the buffer before the position indicated by the indicator of the position of the start of the encapsulating header and updates the indicator to indicate the start position of the encapsulating header of the lower layer.

Copying means 912 copies the encapsulating trailer of the lower layer into the buffer after the position indicated by the indicator of the position of and of the encapsulating trailer and updates the indicator to indicate the end position of the encapsulating trailer of the lower level.

The passing means 914 passes the buffer until the header and the trailer of the lowest layer are copied into the buffer. Finally, copying means 920 copies the buffer contents between the indicators to a transmission device at the lowest layer of the stack.

At step 228, a determination is made as to whether the buffer needs to be passed to a lower layer of the stack. If such a lower layer exists, the buffer is passed to the lower layer at step 232 and steps 212 through 228 are repeated for this layer.

If, at step 228, it is determined that the lowest layer of the stack has been reached, at step 236 the buffer contents, between the header start reference and the trailer end reference, are copied to a device, such as an ethernet card, for transmission. At step 240, the process completes with the buffer being marked as available for reuse, at the appropriate time as mentioned above, depending upon the protocol.

The above-described embodiments of the invention are intended to be examples of the present invention and alterations and modifications may be effected thereto, by those of skill in the art, without departing from the scope of the invention which is defined solely by the claims appended hereto.

We claim:

1. A communication protocol stack apparatus, comprising:

a first protocol layer;

at least one protocol layer below said first protocol layer in said stack;

a binding mechanism for binding said first and each said at least one protocol layers together into a protocol stack, said binding mechanism including means for determining for each layer of said protocol stack in turn, from a lowest layer to said first layer, an aggregate maximum header length and aggregate trailer length for said layer and each layer below said layer;

a buffer allocation mechanism for allocating at least one memory buffer for each layer of said protocol stack, said at least one buffer of each layer having a length at least equal to the sum of said aggregated maximum header and trailer lengths determined for said layer and a selected maximum data payload size;

a buffer passing mechanism for passing an allocated buffer from a higher layer to a lower layer in said protocol stack, said buffer passing mechanism including:

means for copying, for a protocol layer, data to be transmitted from said higher layer into said buffer starting at a position offset from the first position of said buffer by a number of positions equal to said aggregated maximum header length determined for said higher layer, and for copying an encapsulated header for said higher layer into said buffer at the positions immediately preceding said data copied to said buffer and for copying an encapsulating trailer for said higher layer into said buffer at the positions immediately following said data and for setting a first indicator to the start position of said encapsulating header in said buffer and for setting a second indicator to the end position of said encapsulating trailer in said buffer; and means for copying, for each lower layer in said protocol stack, in turn, an encapsulating header for said lower layer into said buffer at the positions immediately preceding said position indicated by said first indicator and for copying an encapsulating trailer for said lower layer into said buffer at the positions immediately following said position indicated by said second indicator and for updating said first indicator to the start position of said encapsulating header for said lower layer in the buffer and for updating said second indicator to the end position of said encapsulating trailer for said lower layer in the buffer.

2. A communication protocol stack apparatus as claimed in claim 1 wherein at least one layer of said stack includes two or more protocols and wherein said binding mechanism considers the largest header and trailer size of said two or more protocols in determining said aggregated maximum header and trailer sizes.

3. A communication protocol stack apparatus as claimed in claim 1 wherein said copied data to be transmitted has a pre-selected length less than the maximum data payload length of the layer, the remaining amount of said data payload being subsequently copied into at least one additional buffer.

4. A communication protocol stack apparatus as claimed in claim 1 wherein said buffer passing mechanism performs a check to determine if a buffer is available for use and, if no buffer is available, waits until a buffer becomes available.

5. A communication protocol stack apparatus as claimed in claim 1 wherein said stack is implemented in the Java programming language.

6. A method of implementing a communication protocol stack of at least a higher protocol layer and a lower protocol layer, comprising the steps of:

(i) determining for each protocol layer of said stack the maximum aggregate header and aggregate trailer length for the layer and each lower layer;

(ii) allocating, for each protocol layer of the stack, at least one memory buffer having a length at least equal to the sum of the determined maximum aggregate header and maximum aggregate trailer lengths for the layer and a selected maximum data payload length;

(iii) receiving at a first layer data to be transmitted from said stack;

(iv) selecting an available buffer from said at least one memory buffer allocated for said first layer;

(v) copying information representing a portion of said received data, not exceeding said selected maximum data payload length, to said buffer starting at a position offset from the start of said buffer by a length equal to said determined maximum header length for said protocol layer;

(vi) copying information representing an encapsulating header for said protocol layer to the positions in said buffer immediately preceding said information previously copied into said buffer and copying information representing an encapsulating trailer for said layer to the positions in said buffer immediately following said information previously copied into said buffer;

(vii) setting a first indicator to indicate the first position in said buffer of said information representing said encapsulating header of said protocol layer and setting a second indicator to indicate the last position in said buffer of said information representing said encapsulating trailer for said protocol layer;

(viii) passing said buffer to the next lower protocol layer in said stack;

(ix) repeating steps (vi) through (viii) until information from the lowest layer has been copied into said buffer and said first and second indicators set accordingly; and (x) copying the information in said buffer, between the position indicated by said first indicator and the position indicated by said second indicator, to a data transmission device.

7. A protocol stack apparatus including at least two protocol layers arranged to form the stack, the stack apparatus comprising:

means for determining the aggregated maximum encapsulating header and trailer lengths for each layer of the stack;

means for pre-allocating for each said protocol layer of said stack, at least one buffer of a length equal to the sum of the determined aggregate maximum header length and the determined aggregate trailer length and a pre-selected maximum data length;

means for receiving at a protocol layer data from an application to copy said data into one of said pre-allocated buffers for said layer at a position offset by the determined maximum aggregate header length and to copy an encapsulating header for said layer to a position immediately before the location of the data in said buffer and to copy an encapsulating trailer for said layer to a position immediately after said data in said buffer;

means for setting an indicator of the position of the start of said encapsulating header in said buffer and for setting an indicator of the position of the end of said encapsulating trailer in said buffer;

means for passing said buffers in turn, to each next lower layer of said protocol stack;

means for copying the encapsulating header of said lower layer into said buffer before the position indicated by said indicator of the position of the start of the encapsulating header and for updating said indicator to indicate the start position of the encapsulating header of said lower layer;

means for copying the encapsulating trailer of said lower layer into said buffer after the position indicated by the indicator of the position of end of the encapsulating trailer and for updating said indicator to indicate the end position of the encapsulating trailer of said lower level;

means for copying the buffer contents between said indicator of the start position of said encapsulating header and the indicator of the end position of said encapsulating trailer to a transmission device at the lowest layer of said stack.

8. A method of constructing and using a protocol stack comprising at least two protocol layers, comprising:

(i) for each layer of said stack determining a maximum length comprising the sum of a preselected maximum data payload length and a maximum aggregate header length and a maximum aggregate trailer length, said aggregates including each layer in said protocol stack below said layer;

(ii) for each layer allocating at least one buffer of said maximum length;

(iii) receiving data to be transmitted at a layer and copying said data into said at least one buffer at a position offset from the start of the buffer by said maximum aggregate header length determined for said layer, copying into said buffer immediately before said copied data a header for said layer, copying into said buffer immediately after said copied data a trailer for said layer and setting indicators of the positions within said buffer of the start of said header and the end of said trailer;

(iv) passing said buffer to a lower layer of said stack, said lower layer copying into said buffer immediately preceding the start of the header in said buffer as indicated by said indicator a header for said layer and copying into said buffer immediately after the end of the trailer in said buffer as indicated by said indicator a trailer for said layer and updating said indicators of the positions of the start of the headers and the end of the trailers accordingly;

(v) at the lowest level of said stack, copying to a data transmission device said data between said indicators.

9. An apparatus for managing a buffer for a protocol stack having at least two protocol layers, said apparatus comprising:

means for allocating for each layer a buffer of a maximum length, said maximum length including the sum of a selected maximum data payload length and a maximum aggregate header length and a maximum aggregate trailer length, said aggregates including each layer in said protocol stack below said layer;

means for copying receiving data to be transmitted at a layer into said buffer at a position offset from the start of the buffer by said maximum aggregate header length determined for said layer;

means for copying a header and a trailer for said layer into said buffer at positions determined by header and trailer indicators, respectively;

means for updating said header and trailer indicators so as to indicate the positions of the start of said header and the end of said trailer in said buffer;

means for passing said buffer to a lower layer to cause said updating means and said means for copying a header and a trailer to operate for said lower layer; and means for copying data between said references to a data transmission device after the header and trailer for the lowest layer are copied into the buffer.

10. The apparatus as claimed in claim 9 further comprising binding means for binding said protocol layers, having means for aggregating a maximum header length for each layer to obtain said maximum aggregate header length, and means for aggregating a maximum trailer length for each layer to obtain said maximum aggregate trailer length.

11. The apparatus as claimed in claim 9 wherein said means for copying a header and a trailer copies said header for said layer into the buffer at a position immediately preceding the start of the header in said buffer.

12. The apparatus as claimed in claim 9 wherein said means for copying a header and a trailer copies said trailer for said layer into said buffer at a position immediately after the end of the trailer in said buffer.

13. The apparatus as claimed in claim 9 wherein said updating means updates said header indicator such that said indicator indicates the start of the header in said buffer.

14. The apparatus as claimed in claim 9 wherein said updating means updates said trailer indicator such that said trailer indicator indicates the end of the trailer in said buffer.

15. The apparatus as claimed in claim 10 wherein at least one layer of said stack includes two or more protocols and wherein said means for aggregating a maximum header length and means for aggregating a maximum trailer length consider the largest header and trailer lengths of said two or more protocols in determining said maximum aggregate header and trailer lengths.

16. The apparatus as claimed in claim 9 wherein said data to be transmitted has a preselected length less than the maximum data payload length of the layer, the remaining amount of said data payload being subsequently copied into at least one additional buffer.

17. The apparatus as claimed in claim 9 further comprising means for determining whether a buffer is available for use to cause said means for copying receiving data to wait until a buffer becomes available.

18. The apparatus as claimed in claim 9 further comprising means for marking said buffer as free for reuse, said marking means marking said buffer as free for reuse after said means for copying data between said references copies said data to the data transmission device.

19. The apparatus as claimed in claim 10 further comprising discovery means for determining said maximum header and maximum trailer lengths.

20. The method is claimed in claim 6 wherein said stack is implemented in the Java programming language.

21. The method as claimed in claim 8 wherein said stack is implemented in the Java programming language.

* * * * *